United States Patent [19]

Mizuhara

[11] Patent Number: 4,897,243

[45] Date of Patent: Jan. 30, 1990

[54] DUCTILE BRAZING ALLOY OF COPPER-NICKEL-SILICON-TITANIUM

[75] Inventor: Howard Mizuhara, Hillsborough, Calif.

[73] Assignee: GTE Products Corporation, Stamford, Conn.

[21] Appl. No.: 268,134

[22] Filed: Nov. 7, 1988

[51] Int. Cl.$^4$ .............................................. C22C 9/06
[52] U.S. Cl. .................................... 420/488; 420/492
[58] Field of Search ................................ 420/488, 492

[56] References Cited

U.S. PATENT DOCUMENTS 4,426,033  1/1984  Mizuhara ............................ 420/488
4,612,167  9/1986  Watanabe et al. .................. 420/488

FOREIGN PATENT DOCUMENTS 0145745  8/1984  Japan ................................. 420/488
0145746  8/1984  Japan ................................. 420/488
0145747  8/1984  Japan ................................. 420/488
0535921  4/1981  United Kingdom ............... 420/488

Primary Examiner—Upendra Roy
Attorney, Agent, or Firm—James Theodosopoulos

[57] ABSTRACT

A brazing alloy useful for brazing ceramics having the following composition, in weight percent: 0.3 to 5% titanium; 2 to 15% nickel; 0.25 to 4% silicon; balance copper.

8 Claims, No Drawings

DUCTILE BRAZING ALLOY OF COPPER-NICKEL-SILICON-TITANIUM

This invention concerns a ductile brazing alloy of copper-nickel-silicon-titanium which can be used for brazing ceramics. Such an alloy is disclosed in U.S. Pat. No. 4,426,033, which discloses alloys within the broad compositional range of 50 to 98.75 wt. % copper, 0.25 to 5 wt. % titanium, vanadium or zirconium, 1 to 45 wt. % silicon, tin, germanium, manganese, nickel or cobalt.

I have found that in order to have a brazing alloy which does not grey upon cooling, but remains metallic shiny, the composition of the alloy must be controlled within narrower limits, and especially the amounts of nickel and silicon. An alloy as per this invention has the following composition, in weight percent: 0.3 to 5% titanium; 2 to 15% nickel; 0.25 to 4% silicon; balance copper.

In the following examples, the compositions are expressed in weight percent.

EXAMPLE 1 (SAMPLE 95-54)

An alloy of 88% Cu, 2% Si, 7.0% Ni, 3% Ti was prepared by melting a 6 gram button on a water cooled copper crucible using tungsten electrode and arc melted under argon atmosphere. The alloy was rolled to a four mil thickness foil. The melting temperature was determined to be 1083° C. liquidus/1071° C. solidus. The foil was placed between Al-995 alumina ceramic and Alloy 42 (42 Ni-58 Fe) and type 410 stainless steel (Fe-Cr) and brazed at 1110° C. under $10^{-5}$ torr vacuum. The brazing alloy formed a small fillet on both Alloy 42 and the stainless steel and joined both to alumina. The braze alloy after brazing showed a yellowish bright metallic color.

EXAMPLE 2 (Sample 95-55)

An alloy of 92% Cu, 1% Si, 4% Ni, 3% Ti was prepared as in Example 1 and was used to braze Alloy 42 and also type 410 stainless to Al-995 alumina substrate at 1100° C. under $10^{-5}$ torr vacuum. The brazing alloy showed slight filleting on both metals. An excellent bright joint was formed between the alumina ceramic and the metals.

EXAMPLE 3 (Sample 20-49)

An alloy of 91.25% Cu, 1% Si, 1% Ti, 6.75% Ni was prepared as an ingot. The ingot was reduced to a 4 mil foil using intermediate anneal in a vacuum. The alloy was ductile with 1099° C. liquidus and 1083° C. solidus.

A Kovar strip ¼" wide by 3" long by 0.10" thick was brazed to 1¼"×1¼×0.100" thick Al-995 alumina substrate using the 4 mil foil at 1125° C. for 2 minutes under $10^{-5}$ torr vacuum. The Kovar was peeled off at a rate of 2" per minute using an Instron Tensile Tester, which resulted in a 20 pound peeling force. This peel strength is better than that obtained by the use of the molybdenum manganese process for brazing to alumina. Kovar is Westinghouse's trademark for an FeNiCo alloy.

EXAMPLE 4 (Sample 20-47)

An alloy of 90% Cu, 1.25% Si, 1.25% Ti, 7.5% Ni was weighed, and 20 troy ounces were melted in a dense alumina crucible under $10^{-5}$ torr vacuum, and cast into a ½" thick×3" wide copper mold. The ingot was rolled to a 4 mil foil with two intermediate vacuum anneals. The above alloy was placed between Al-995 alumina and a silicon nitride ceramic and heated to 1100° C. under $10^{-5}$ torr vacuum. An excellent braze was made. A Kovar strip ¼"×3"×0.010" thick was brazed to an Al-995 substrate 1¼"×1¼"×0.100" thick at 1105° C. by 5 minute hold under $10^{10-5}$ torr vacuum. This braze yielded a 17 pound peeling force, which is an excellent peel strength.

EXAMPLE 5

An alloy of 91.1% Cu, 1.3% Si, 7.5% Ni was gas atomized to a powder and passed through a 150 mesh screen. A mixture was prepared comprising 98.5% of the minus 150 mesh alloy powder and 1.5% titanium hydride powder. This powder mixture was mixed with a screening oil to form a screenable paste consisting of 85% powder, 15% oil. The paste was screened onto a 1¼" square by 100 mils thick Al-995 alumina substrate using a 105 mesh screen. The coated substrate was oven dried at 100° C. for 30 minutes and a Kovar strip (¼"×3"×10 mils thick) was placed on top and brazed at 1125° C. under $10^{-5}$ torr vacuum. An excellent braze resulted with an 18 pound force peel strength.

EXAMPLE 6 (Sample 20.47)

An alloy of 90% Cu, 1.25% Si, 1.25% Ti, 7.5% Ni was rolled down to a 4 mil thick foil. The foil was placed between a high density graphite cylinder, 1" diameter by ½" thick, and a similar cylinder of silicon nitride ceramic. The assembly was brazed at 1125° C. under $10^{10-5}$ torr vacuum. An excellent sound braze joint resulted.

EXAMPLE 7 (Sample 20-51)

An alloy with a composition of 89.5% Cu, 1% si, 1% Ti, 8.5% Ni was cast and rolled to 2 mil thick foil. A 2 mil foil of this alloy was placed between silicon nitride and silicon carbide ceramic discs and brazed at 1125° C. under $10^{10-5}$ torr vacuum. An excellent braze resulted.

Table 1 shows examples of brazing alloy compositions within this invention. The compositions are in weight percent. KHN means Knoop hardness number.

TABLE 1

| Sample | Cu | Si | Ti | Ni | Sol | Liq | KHN | Peel Lbs |
|---|---|---|---|---|---|---|---|---|
| 95-50 | 90 | 1 | 3 | 6 | 1068 | 1096 | 134 | |
| 95-54 | 88 | 2 | 3 | 7 | 1071 | 1083 | 132 | |
| 95-55 | 92 | 1 | 3 | 4 | 1054 | 1088 | 132 | |
| 95-58 | 88 | 3 | 3 | 6 | 1025 | 1061 | 151 | |
| 95-68 | 89 | 0.5 | 4 | 6.5 | 1051 | 1084 | 174 | |
| 20-23 | 95 | 1 | 1 | 3 | 1065 | 1081 | 141 | |
| 20-29 | 92.5 | 1 | 1.5 | 5 | 1074 | 1089 | 137 | |
| 20-45 | 89.25 | 1.5 | 1.75 | 7.5 | 1071 | 1094 | 139 | 14–16 |
| 20-47 | 90 | 1.25 | 1.25 | 7.5 | 1078 | 1112 | 126 | 16–22 |
| 20-49 | 91.25 | 1.0 | 1.0 | 6.75 | 1083 | 1099 | 117 | 16–25 |
| 20-50 | 90.75 | 1.0 | 0.75 | 7.5 | 1087 | 1103 | 122 | 20–25 |
| 20-51 | 89.5 | 1.0 | 1.0 | 8.5 | 1082 | 1110 | 101 | 18–30 |
| 20-60 | 91.5 | 1.0 | 0.5 | 7.0 | 1074 | 1089 | 115 | 10–15 |
| 20-64 | 91.75 | 1.0 | 0.25 | 7.0 | 1070 | 1101 | 117 | 10–15 |
| 20-68 | 85.75 | 1.25 | 1.0 | 12.0 | 1086 | 1111 | 121 | |
| 20-69 | 82.75 | 1.25 | 1.0 | 15.0 | 1087 | 1121 | 145 | |

Brazing alloys having compositions within this invention may be used in powder form as in Example 5, in wire form made by drawing, or as a foil as in Examples 1, 3, 4, 6 and 7.

I claim:

1. A brazing alloy consisting of, in weight percent; 0.3 to 5% Ti; 2 to 15% Ni; 0.25 to 4% Si; balance copper.

2. A brazing alloy wire having the composition of claim 1.

3. A brazing alloy of claim 1 consisting of 88% Cu, 2% Si, 7% Ni; 3% Ti.

4. A brazing alloy of claim 1 consisting of 92% Cu, 1% Si, 4% Ni; 3% Ti.

5. The brazing alloy of claim 1 consisting of 91.25% Cu, 1% Si, 6.75% Ni; 1%.

6. The brazing alloy of claim 1 consisting of 90% Cu, 1.25% Si, 7.5% Ni; 1.25% Ti.

7. The brazing alloy of claim 1 consisting of 89.5% Cu, 1% Si, 8.5% Ni; 1% Ti.

8. A brazing alloy, for brazing ceramics, which does not grey upon cooling after brazing, the brazing alloy composition consisting of, in weight percent: 0.3 to 5% Ti; 2 to 15% Ni; 0.25 to 4% Si; balance copper.

* * * * *